UNITED STATES PATENT OFFICE.

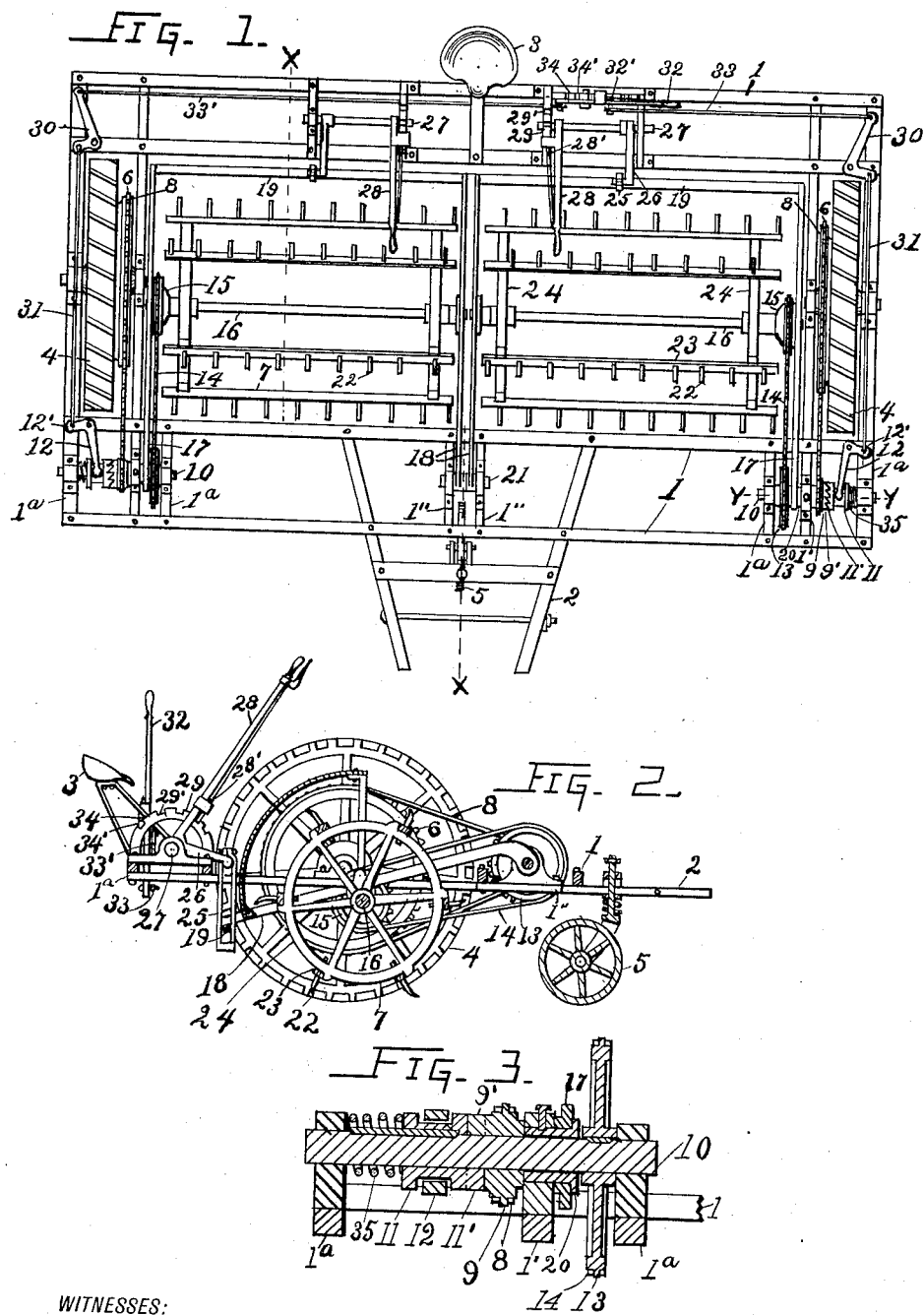

URI O. DOWNEY, OF PLATTE COUNTY, NEAR RUSHVILLE, MISSOURI.

ROTARY HARROW.

1,056,514. Specification of Letters Patent. Patented Mar. 18, 1913.

Application filed August 23, 1912. Serial No. 716,785.

*To all whom it may concern:*

Be it known that I, URI O. DOWNEY, a citizen of the United States, residing in Platte county, near Rushville, in the county of Buchanan and State of Missouri, have invented certain new and useful Improvements in Rotary Harrows, of which the following is a specification, reference being had therein to the accompanying drawing.

My invention relates to improvements in rotary harrows, the objects of which are to provide a simple, substantial, compact and durable harrow of this class which shall thoroughly pulverize the soil after the ground has been broken or plowed, and which shall readily shed or throw off such weeds, grass, and the like as may be picked up by the harrow teeth when in operation.

Further objects are, to so construct a rotary harrow, that either one or both of two rotary sections may readily be lifted above the ground, for turning curves or for transporting them on the ground wheels and the front wheel.

I attain these objects by the mechanism illustrated in the accompanying drawing, in which:—

Figure 1 is a top plan with the shield removed, to avoid obscurity. Fig. 2 is a vertical section on the line X X, seen in Fig. 1. Fig. 3 is an enlarged vertical section of one of the counter-shafts, on the line Y Y, seen in Fig. 1.

Frame 1 has hounds 2 secured to the front portion thereof, for attachment of an ordinary tongue, not shown. Seat 3 is secured on the center of the rear portion of frame 1, which latter is mounted on ground wheels 4 and front wheel 5. Each of said ground wheels is provided with a drive sprocket wheel 6, for driving a rotatably mounted cylinder 7, and since the two cylinders 7 which are shown, are alike in construction and operation, a detailed description of one is sufficient. Wheel 6, by sprocket chain 8, drives sprocket pinion 9, loosely mounted on counter-shaft 10, rotatably mounted on frame 1. Sleeve 11 is slidably splined on shaft 10 and is slid or shifted thereon, by shifter fork 12, for disengaging ratchet teeth 11' from ratchet teeth 9', formed with pinion 9. On counter-shaft 10 is secured the sprocket wheel 13, which, by chain 14, drives cylinder sprocket wheel 15, secured on cylinder shaft 16, rotatably mounted on cylinder frame sides 17 and 18. The rear ends of said frame sides are connected by rear frame bar 19. The front end of frame side 17 is pivotally mounted on pivot sleeve, 20, see Fig. 3. Said pivot sleeve is rigidly mounted on frame piece 1', secured on the front portion of frame 1. Shaft 10 is passed loosely through said sleeve 20 and has its ends rotatably mounted on frame pieces 1ª, secured on the front portion of frame 1, seen in Fig. 1. The central pivot 21 is rigidly mounted on frame pieces 1'', secured on the front portion of frame 1. Said pivot is placed in alinement with counter-shaft 10, and has the front end of frame side 18 pivotally mounted thereon. Curved harrow teeth 22 are secured in bars 23, secured on cylinder ends 24, secured on shaft 16. Said teeth are so placed in said bars, that they curve outward and downward at the rear of the described cylinder, (as seen in Fig. 2,) thus providing teeth that shed weeds, grass, and the like therefrom when in use.

The described cylinder 7 and its frame are lifted above the ground, by link 25, encircling the central portion of rear bar 19; the upper end of said link being pivotally connected with lift crank 26, secured on lift shaft 27, rotatably mounted on the rear portion of frame 1. Said lift shaft is provided with lift lever 28, for rotating said lift shaft. Said lift lever is secured in various adjustments of position, by latch bolt 28', (see Fig. 2,) adapted to engage the notches 29', formed in arch 29, secured on frame 1. Shifter fork 12 is pivotally mounted on frame 1, and is provided with L crank 12', formed therewith, as seen in Fig. 1. Said L crank is connected with the outer end of rear L crank 30, by pull rod 31, while the rear end of L crank 30 is connected with the upper portion of shift lever 32, by rod 33.

Lever 32 is provided with latch bolt 32', adapted to engage notches 34', formed in arch 34, for holding said lever in either one of its two positions, and thereby holding the previously described driving mechanism in disengaged position, and for holding said lever in engaged position. Said driving mechanism is forced into engaged position by spring 35, (see Fig. 3,) which is loosely mounted on shaft 10, between one of the frame pieces 1ª and the outer end of the splined sleeve 11, and is adapted to move the same into its previously described engagement with pinion 9. Referring to Fig. 1, the inner end of rod 33' is pivotally connected with the lower portion of the lever 32, for pulling the undescribed driving mechanism out of gear.

In operation, with the parts in the position shown, the harrow is drawn by hounds 2, in the usual well known manner, thereby rotating ground wheels 4, which, by the previously described sprocket drive connections, rotate cylinders 7. Said sprocket drive connections have their parts so proportioned, that said cylinders are rotated at a much higher rate of speed than the travel of the harrow. This high rate of speed causes the harrow teeth to thoroughly pulverize the ground. The operator, not shown, is seated on seat 3, and at his pleasure, lifts either one or both of cylinders 7, by operation of levers 28, for turning curves, or for transporting the harrow. Said operator, when desired grasps lever 32, and thereby simultaneously pulls the driving mechanisms of both cylinders out of gear, thus stopping rotation of the same.

I am aware that rotary harrows have been invented in which a single cylinder, provided with disengageable driving means therefor, is rotatably mounted in a cylinder frame, said frame being pivotally mounted at one of its edges, on a counter-shaft and provided with lifting means connected with the opposite or free edge of said cylinder frame, and therefore do not broadly claim such. But in all such old harrows of which I am aware, there are none which have a plurality of harrow cylinders each of which is provided with independent lifting means and with driving means, provided with disengaging means on a countershaft for disengaging said driving means. Nor have any of said old harrows been provided with anti-friction pivotal mountings for their cylinder frames, whereby the friction of said mountings have been entirely obviated, as I have done.

Therefore, what I claim as new and desire to secure by Letters Patent is:

In a harrow, a frame, a pair of ground wheels and a front wheel for transportably supporting said frame; a pivot sleeve rigidly mounted on said frame, in front of one of said ground wheels; a counter-shaft passed loosely through said sleeve, said countershaft having its ends rotatably mounted on said frame; a central pivot rigidly mounted on said frame in alinement with said counter-shaft; a cylinder frame side having its front end pivotally mounted on said pivot sleeve; another cylinder frame side having its front end pivotally mounted on said central pivot; a rear frame bar secured to the rear ends of said cylinder frame sides; a cylinder provided with harrow teeth secured thereon said cylinder being rotatably mounted on said frame sides; driving means whereby said counter shaft is driven by said ground wheel; rotating means whereby said cylinder is rotated by said countershaft; disengaging means on said countershaft whereby the same is disengaged from said driving means; and lifting means whereby said rear frame bar is lifted for lifting said cylinder.

In testimony whereof I affix my signature in the presence of two witnesses.

URI O. DOWNEY.

Witnesses:
 ANNA MYERS,
 EDWARD F. KAPUS.

---

Copies of this patent may be obtained for five cents each, by addressing the "Commissioner of Patents, Washington, D. C."